INVENTOR
Oliver Kaye
BY
ATTORNEY

Feb. 12, 1963   O. KAYE   3,077,029
METHOD OF MAKING A DIAPHRAGM VALVE
Filed Aug. 29, 1958   4 Sheets-Sheet 2

INVENTOR
Oliver Kaye
BY
ATTORNEY

INVENTOR
Oliver Kaye
BY [signature]
ATTORNEY

Feb. 12, 1963    O. KAYE    3,077,029
METHOD OF MAKING A DIAPHRAGM VALVE
Filed Aug. 29, 1958    4 Sheets-Sheet 4

INVENTOR
Oliver Kaye
BY G. E. O'dell
ATTORNEY 3,077,029
METHOD OF MAKING A DIAPHRAGM VALVE
Oliver Kaye, Cwmbran, England, assignor to Saunders Valve Company Limited, Cwmbran, England, a British company
Filed Aug. 29, 1958, Ser. No. 758,654
Claims priority, application Great Britain Aug. 30, 1957
10 Claims. (Cl. 29—157.1)

This invention relates to diaphragm valves of the kind in which the body has a bore rising to and falling from a shallow concave-faced weir extending across the bore, the concave weir face forming a seating for the diaphragm. Valves of this character in which the flow suffers only smooth, easy changes of direction and thus small loss of head, are well known under the registered trademark SAUNDERS and a typical valve of this character is shown for example in British patent specification No. 516,526 and other specifications referred to therein. That specification is concerned with the operating mechanism, while the present invention is concerned with the body but that specification shows very clearly the form of body which is customary in such valves.

It is at the present time a commonplace in engineering production to fabricate parts instead of casting them to shape, that is to say to make them by fusion joining e.g. welding or soldering plates, rods, bars and the like pieces of standard material, where the advantages of this method outweigh the extra expense as compared with casting or where the cost is less as is sometimes the case.

It will be apparent however that to produce a body of the kind here in question by fabrication presents problems on account of the complicated shape. Substantial departures from the existing shape are not acceptable because either the flow conditions would be seriously worsened, thus increasing the loss of head through the valve, or the valve would become of much larger bulk and thus not be of standard dimensions and interchangeable with valves having cast bodies.

It will be clear that the major difficulty is presented by the shape of the passage leading from the inlet fitting to the weir and from the weir to the outlet fitting. According to the present invention each of these passages is made from a length of tubing which to begin with is of elliptical cross section at least at the end which is to connect with the end fitting such that by parting off the end on a plane, the normal to which makes a fairly small angle to the axis, the aperture is circular enabling it to be fusion joined to an end fitting which matches the pipe size for which the valve is intended; then the tube is squeezed so that its other end takes an elongated oval form with its major axis transverse, the end is faced off normal to the axis of the end fitting whereby it can fit against a weir plate to which it is subsequently fusion joined; and a boring operation is effected from above to provide each of the two tubes with a recess to receive substantially one half of a weir flange which is fusion joined in and also fusion joined to the weir plate and then serves as the flange against which the diaphragm is clamped.

The end fittings of the valve body may be of any kind lending themselves to fusion joining to the tubes. Thus they may be internally or externally screwed fittings, or bevelled or similar fittings to form parts of joints to the pipe held by clamping devices, or ordinary flanges designed to be bolted to flanges on the pipes. The fusion joints may be soldered or welded according to the materials of which the body is made and the fluid for which the valve is intended.

The invention will be further described with reference to the accompanying drawings showing an embodiment in which flanged connecting fittings and welded joints have been used as an example.

Figure 4:
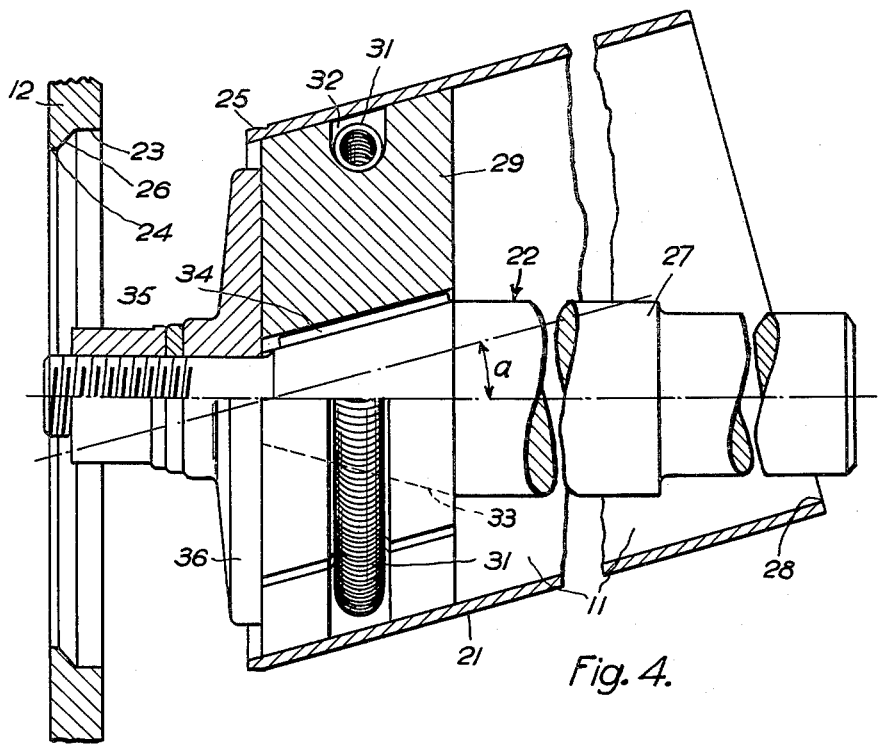
Figure 5:
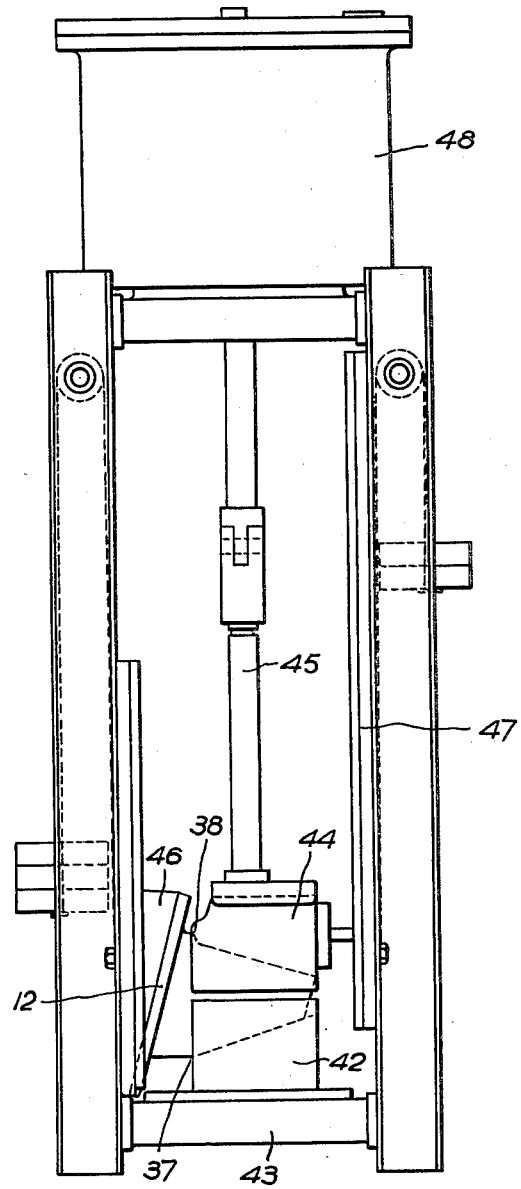
Figure 6:
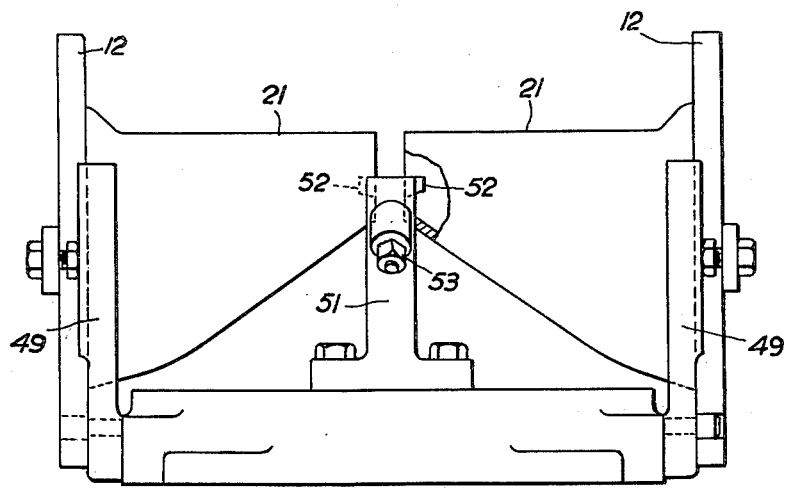
Figure 7:
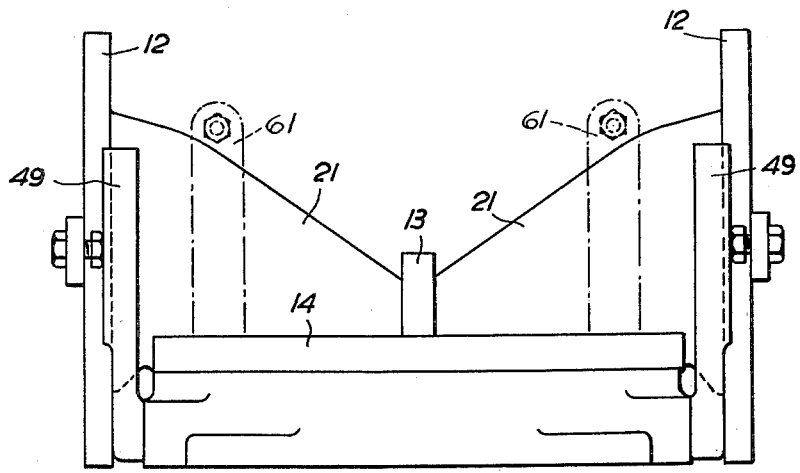

FIGURE 4 is a side view partly in section of a mandrel used for bringing the tube to the elliptical cross section and holding it while the end is being parted off and machined, with the tube in place, FIGURE 5 is a elevation with some parts in section of a press used for squeezing the tube after it has been welded to the end flange, FIGURES 6 and 7 are side views partly in section of a jig which is used for holding the tubes after squeezing in position for machining to receive the weir flange, this use being illustrated in FIGURE 6 and for holding the tubes thereafter for tack welding to the weir flange, this position being shown in FIGURE 7.

Figure 1:
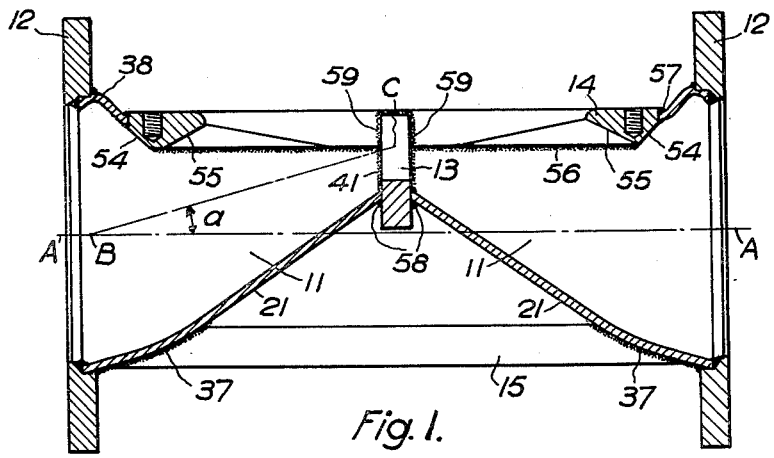
FIGURE 1 is a longitudinal section of the complete valve body.
Figure 2:
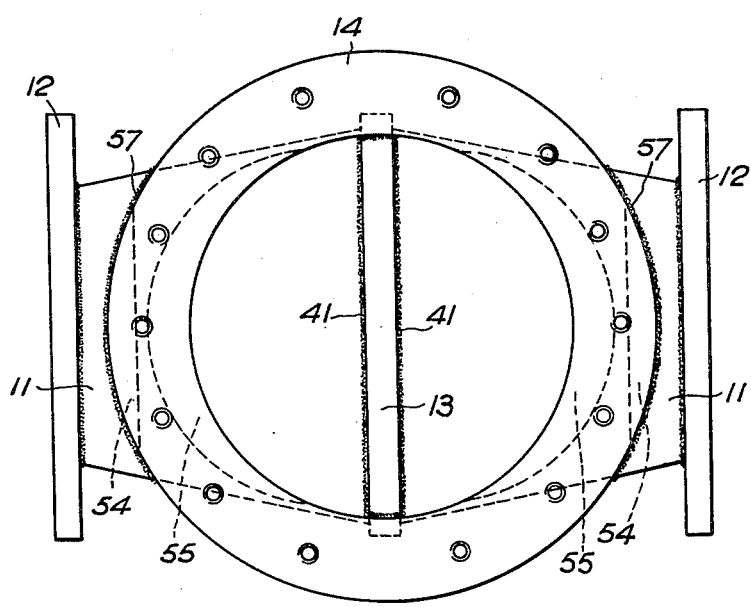
FIGURE 2 is a plan view of FIGURE 1.
Figure 3:
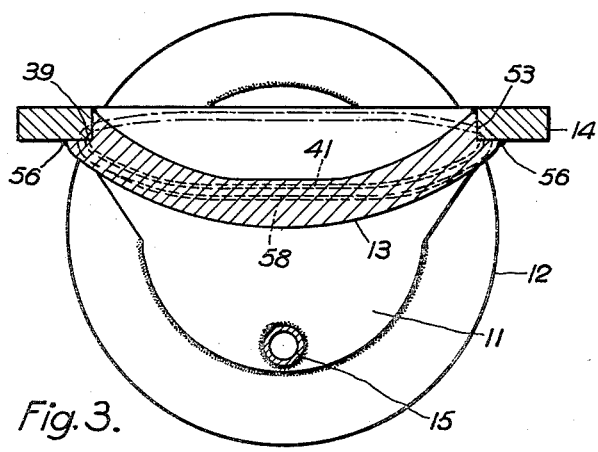
FIGURE 3 is a cross section of FIGURE 1.

As will be seen from FIGURES 1 to 3 the valve body produced by the invention comprises two passages 11, leading from an end flange 12 to a weir 13 and weir flange 14 all held together by welding; there may also be a longitudinal stay 15 welded in position.

It will be seen that the valve body illustrated in the provision of the passages 11, end flanges 12, weir 13 and weir flange 14 resembles bodies previously made by casting and used in diaphragm valves of the well known type disclosed for example in United States Patent Nos. Re. 19,151, 2,397,373 and 2,605,991. In the complete valve a bonnet containing diaphragm operating mecahnism is bolted to the flange 14, the margin of the diaphragm which co-operates with the weir being clamped between the flange 14 and a corresponding flange on the bonnet. The end flanges 12 enable the valve to be included in a pipe line.

An important datum in determining the dimensions and form of the parts from which the valve body is made is the angle $a$ between the axis A—A of the end flanges 12 and a line B—C joining the centre B of the body end of the bore of end flange 12 and the centre C of the weir underside of the flange 14. To obtain the same overall dimensions as in the case of a cast body, the same value of this angle may be chosen as in a cast body. In practice this angle is usually 15° and that value has been adopted in the example here illustrated.

This same angle is the angle at which the axis of the tube from which each passage 11 is made, is set to the axis of the end flange when they are fitted together and welded. The cross section of the tube normal to its axis is made such, i.e. elliptical with its major axis set at right angles to the plane in which the angle of 15° is measured, that the parting off of the end of the the tube parallel with the flange gives it a circular cross section.

A very convenient way of giving the tube its starting cross section is illustrated in FIGURE 4. Here a length 21 of tubing, originally of circular cross section is mounted on a mandrel 22 which brings it to the appropriate section and direction in relation to the axis of the mandrel. With the tube mounted the mandrel can be used in the lathe for parting off and machining the tube end to fit the end flange 12 which has previously been step bored as at 23, 24.

It will generally be convenient to use tubing of the same nominal bore as the valve. Then the deformation on the mandrel will produce an elliptical cross section having its minor axis smaller and its major axis larger than those of the tube and when this is parted off the aperture will have a diameter equal to the major axis i.e. larger than the nominal bore. But with an angle $a$ between the axis of the tube and the axis of the end flange of about 15° the difference is very small. The counterbore 23 in the end flange 12 should be of such diameter that a cylindrical surface 25 has to be machined on the tube end to fit. When this cylindrical portion has been entered into the bore in the end flange 12 the mandrel 22 may be removed before welding. Preferably the joint is welded externally and internally, a chamfer 26 at the bottom of the counterbore providing a recess for the weld metal.

The mandrel may comprise a mandrel 27 proper of such diameter as to clear the wall of the tube at its far end 28 when centred in the end to be parted off. At this region (but clear of the parting cut) it carries a disc 29 cut into segments, say four, the periphery of which is shaped (conveniently by cutting at an appropriate angle a thick slice from a body turned to the correct section) to the required internal section of the tube; the segments may be held together by a tension spring 31 sunk into a peripheral groove 32. The segments have a taper bore which seats on a taper part 33 of the mandrel and when the disc is cut into segments sufficient metal is cut away so that when the segments are run to the small end of the taper their periphery will enter the tube; one of the segments is slidably keyed at 34 to the mandrel. Then by tightening a nut 35 on the mandrel, the segments, through a thrust plate 36 are forced along the taper and thus expanded until the section of the tube is brought to the required form for parting off and machining to fit the bore in the end flange 12; the disc conveys the drive to the tube for the purpose.

The squeezing operation which is conducted under heat conveniently in a press illustrated in FIGURE 5, results in the lower part of the tube being swept upwards from a point 37 a little inwards from the junction with the end flange 12 at a greater angle than the original angle a between the axis of the tube and the axis of the end flange bore and in the upper part being swept downwards below its original angle from a point 38 a little inwards from the junction with the end flange.

With a valve body of the proportions usual, the upsweep of the lower part will result in the above mentioned angle of 15° increasing at the point 37 to 30° to 40°, while the downsweep of the upper part from the point 38 would with symmetrical squeezing be about 0° to 10° below the horizontal. To keep the height of the body down however it is desirable to press the upper part further downwardly, this resulting in a more pronounced downward curve of the upper side of the tube adjoining its welded junction with the end flange, this curve terminating with a downward slope of perhaps 45° as may be seen in FIGURES 1 and 5.

After squeezing the other end of the tube will be of fairly elongated more or less oval form. After facing the end parallel with the end flange and boring from above, only just over half the oval is left, seen in dotted lines in FIGURE 3 while the cut away upper part is indicated in chain lines. The form of the oval should be chosen so that the sharpest curve at the ends (i.e. the sides of the valve) is not excessive for the material (an internal radius of three times the thickness is suitable), so that the ends will come just sufficiently beyond the bore of the weir flange to provide room as at 39 FIGURE 3 for weld material without projecting into the bore of the weir flange 13, and so that from the ends the upper edge lies sufficiently below the weir surface (described below) to provide ample room for welding as at 41 without encroaching on the seating surface.

The squeezing operation causes substantially no change in the peripheral length of the tube and the major and minor axes of the oval remain related by this condition. The cross sectional area of this end is reduced as compared with a circular form but the change in cross section from the other end of the tube will be gradual and with a body of the usual proportions a satisfactory result can generally be obtained by using a tube of constant bore so that seamless tubing may be used and the illustrated example relates to such a case. However, if desired a change in diameter of the original tube along its length may be made, in which case a tube of frusto-conical form can be fabricated from plate. The preparation and the welding of the one end to the end flange and the squeezing can still be done in the same way.

In the press shown in FIGURE 5 the squeezing is done between a pair of formers, one 42 mounted on the base 43 and the other 44 on the ram 45 of the press which has a long enough stroke to provide ample room when the ram is retracted to permit the convenient insertion of the workpiece and for the manipulation of burners for heating the workpiece which is secured to a support 46 guided to move parallel with the stroke of the ram. The former 44 carried by the ram 45 may be supported by a guide 47 to relieve the ram of side thrusts. By way of example the press is here shown equipped with a pneumatic or hydraulic cylinder 48.

After each tube has been squeezed to form, its end remote from the flange 12 is faced off parallel with the flange at the correct distance. Two flanges carrying squeezed tubes faced off to length may now be clamped in a jig as shown in FIGURE 6 which holds them in their correct relative point. It conveniently includes two pairs of end brackets 49 to which the flanges 12 are clamped and two centre brackets 51 having a supporting surface on which the ends of the ovals to which the tubes have been squeezed rest, and two projecting lugs 52 which engage in the ends of the ovals and can be drawn down by a nut 53 to clip the ends of the ovals against the supporting surface. The two tubes are now bored from above down to the requisite level to cut away the tops of the tubes and provide for the reception of the weir flange 13.

Before being assembled to the cut away tubes, the weir flange 14 is first welded to the weir plate 13 which is notched out at the ends at 53 FIGURE 3 to receive the flange. The contour of the weir is advantageously as set forth in British patent specification No. 434,684, that is to say its central part is flat and its ends are curved upwards. As will be seen in FIGURE 3 these ends are level with the upper surface of the weir flange. As shown in FIGURE 7 the same jig may be used for assembly of the weir flange to the tubes by removing the workpieces and the centre brackets 51 and attaching the weir flange 14 (with the weir plate 13 already welded to it as described above) face down to the base of the jig. The two end flanges 12 are then remounted upside down on the brackets 49 so that they mate up with the weir flange 14 and weir plate 13 and the parts are then tack welded together. They are then removed from the jig for completion of the welding.

At a convenient stage, preferably before welding of the body, the flange 14 is drilled and tapped to receive the usual holding down bolts for a bonnet and operating mechanism of any usual kind and where the holes are in a position where they would enter the valve bore they are preferably blind holes to avoid risk of leakage.

If the edges of the weir flange 14 present corners to the flow through the valve, the underside of the weir flange, where it extends across the tube near the end flange 12, may be bevelled off transversely as at 54, FIGURES 1 and 2 while its bore may also be bevelled with a form which is deepest opposite the end flanges and dies away at the sides as at 55, FIGURES 1 and 2.

To strengthen the valve body formed as above described the stay 15 FIGURE 1 may be provided. This is conveniently a piece of tube extending lengthwise of the valve and welded to the two tubes 25 adjacent their junctions with the end flanges 12. Brackets 61 shown dotted in FIGURE 7 located from holes in the weir flange may steady the stay during tack welding.

The tubes 21 are preferably welded to the weir flange 14 internally and externally as at 56, 57. The junctions between the tubes and the weir plate 13 are preferably welded externally at 58 as well as internally at 41, the latter welds being continued at the internal junctions 59 between the weir plate 13 and the weir flange 14.

The flanges 12, 14 and weir plate 13 may be flame cut, the bores of the flanges then being machined, while the upper edge of the weir plate constituting the seating surface is cleaned up after flame cutting.

A suitable material for fabricating a valve body as above described is mild steel but in particular cases any other material which can be welded may be used. An advantage of the invention is a considerable saving in weight as compared with a cast body able to resist the same internal pressure. For example a valve for an 8 inch pipe and a working pressure of 50 lbs. per square inch may have steel tube walls of $5/32$ or $3/16$ inch thick, end flanges 12 of $3/4$ inch plate, a weir flange 14 of 1 inch plate, and a weir plate 13 of 1 or $1 1/4$ inch plate, the latter being made of this thickness in order to provide an adequate seating surface rather than strength alone. The width of the weir plate is such as to give it adequate strength, say 1 inch to $1 1/4$ inches, its centre projecting well below the outer weld seam 58 with the tubes. A cast body of the usual form for a valve of this size has a weight after machining of about 144 lbs. while a body made according to the present invention has a finished weight of about 64 lbs.

I claim:

1. A method of making the body of a diaphragm valve having a passage rising from an inlet fitting to a shallow concave faced weir and a passage falling from the weir to an outlet fitting, which comprises providing two identical lengths of tubing one for each passage and each of which to begin with is of elliptical cross section at least at the end which is to connect with the end fitting such that by parting off this end on a plane the normal to which makes a fairly small angle to the axis, the aperture is circular and matches the pipe size for which the valve is intended, parting off each length of tubing in said plane in the part of elliptical cross section and fusion joining this end to a respective end fitting, squeezing each length of tubing so that its other end takes an elongated oval form with its major axis perpendicular to that plane perpendicular to the tube end fitting in which the axis of the length of the tubing lies, facing off this end of each length of tubing normal to the axis of the end fitting to enable it to fit against a plate forming the weir, effecting a boring operation from the side towards which the length of tubing slopes to provide the tube with a recess to receive substantially one half of a weir flange, fusion joining the weir plate to the weir flange, fusion joining the faced off ends of the two lengths of tubing respectively to opposite sides of the weir plate, and fusion joining the weir flange to the two lengths of tubing at the line of the bored recess.

2. A method according to claim 1 in which the angle at which the first mentioned end of each length of tubing is parted off is substantially equal to the angle between the axis of the end fittings and a line joining the centre of the body end of one end fitting and the centre of the underside of the weir flange in the finished body.

3. A method according to claim 1 in which the angle at which the first mentioned end of each length of tubing is parted off is about 15°.

4. A method according to claim 1 in which each length of tubing is originally of circular cross section at the end to be joined to the end fitting and is brought to the appropriate elliptical cross section for parting off by means of a mandrel upon which the length of tubing is mounted for the operation of parting off.

5. A method acccording to claim 4 in which the mandrel includes a disc shaped to the required internal section of the length of tubing and made in a plurality of segments fitted to a taper on the mandrel so that by axial displacement on the taper the disc can be expanded to bring the tube to the required form and hold it during machining.

6. A method according to claim 1 in which the end of each length of tubing to be joined to the end fitting has a cylindrical portion machined on it and a stepped bore is machined in the end fitting to receive the cylindrical portion.

7. A method according to claim 1 in which the squeezing operation is so effected that the half of the length of tubing on the side from which the boring operation is to be performed is squeezed in to a greater extent than the other half.

8. A method according to claim 1 in which the boring operation cuts away almost half the oval to which the end of each length of tubing has been squeezed.

9. A method according to claim 1 in which each length of tubing is originally of constant cross section.

10. A method according to claim 1 in which the ends of the two lengths of tubing are joined internally and externally to the weir plate, the shape to which the ends are squeezed and the shape of the weir plate being so related that room is left for joining metal without encroaching on the seating surface of the weir or into the bore of the weir flange.

References Cited in the file of this patent

UNITED STATES PATENTS

| 652,030 | Lentz | June 19, 1900 |
| 1,652,542 | Perry | Dec. 13, 1927 |
| 2,254,427 | Hehemann | Sept. 2, 1941 |
| 2,363,943 | Carlson | Nov. 28, 1944 |
| 2,429,602 | Boteler | Oct. 28, 1947 |
| 2,573,177 | Bohlen | Oct. 30, 1951 |
| 2,616,164 | Tiedemann | Nov. 4, 1952 |